(12) United States Patent
Munier et al.

(10) Patent No.: US 10,070,366 B2
(45) Date of Patent: Sep. 4, 2018

(54) SYSTEM, METHOD, AND APPARATUS FOR OFFLOADING WIRELESS DEVICES

(71) Applicant: TELEFONAKTIEBOLAGET LM ERICSSON (PUBL), Stockholm (SE)

(72) Inventors: Florent Munier, Västra Frölunda (SE); Gerardo Agni Medina Acosta, Märsta (SE); Nianshan Shi, Järfälla (SE); Mark Curran, County Carlow (IE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 128 days.

(21) Appl. No.: 15/094,429

(22) Filed: Apr. 8, 2016

(65) Prior Publication Data

US 2016/0302131 A1 Oct. 13, 2016
US 2017/0208527 A9 Jul. 20, 2017

Related U.S. Application Data

(60) Provisional application No. 62/145,555, filed on Apr. 10, 2015, provisional application No. 62/145,601, filed on Apr. 10, 2015.

(51) Int. Cl.
*H04W 36/38* (2009.01)
*H04W 36/22* (2009.01)
(Continued)

(52) U.S. Cl.
CPC ......... *H04W 36/385* (2013.01); *H04W 24/10* (2013.01); *H04W 36/22* (2013.01);
(Continued)

(58) Field of Classification Search
CPC ... H04W 36/385; H04W 36/22; H04W 24/10; H04W 28/08; H04W 88/14; H04W 24/02;
(Continued)

(56) References Cited

U.S. PATENT DOCUMENTS 6,195,342 B1 * 2/2001 Rohani ................. H04W 36/30
370/331
7,110,766 B1 * 9/2006 Tayloe .............. H04W 36/0061
370/331

(Continued)

OTHER PUBLICATIONS $3^{rd}$ Generation Partnership Project; Universal Mobile Telecommunications System (UMTS); Services provided by the physical layer (3GPP TS 25.302 versions 6.2.0 Release 6) 3GPP TS 125.302 V6.2.0 (Dec. 2004).*

(Continued)

*Primary Examiner* — Brian O'Connor

(57) ABSTRACT

In accordance with particular embodiments, a method for offloading a wireless device is disclosed. The method comprises identifying a second best cell. The second best cell provides the wireless device with a second wireless signal that has a first signal characteristic that is less than a corresponding first signal characteristic of a first wireless signal provided by a serving cell. The method also includes offloading the wireless device from the serving cell to the second best cell despite the first signal characteristic of the first wireless signal of the serving cell being better than the first signal characteristic of the second wireless signal of the second best cell.

27 Claims, 7 Drawing Sheets

(51) Int. Cl.
*H04W 24/10* (2009.01)
*H04W 88/14* (2009.01)
*H04L 1/16* (2006.01)
*H04W 28/08* (2009.01)
*H04L 5/00* (2006.01)

(52) U.S. Cl.
CPC .......... *H04L 1/1671* (2013.01); *H04L 5/0057* (2013.01); *H04W 28/08* (2013.01); *H04W 88/14* (2013.01)

(58) Field of Classification Search
CPC ............... H04W 24/08; H04W 28/085; H04W 36/0016; H04W 36/0055; H04W 36/0061; H04W 36/0083; H04W 36/0088; H04W 36/06; H04W 36/08; H04W 36/16; H04W 36/30; H04W 36/32; H04W 72/085; H04W 84/045; H04L 5/0057; H04L 1/1671; H04B 17/318; H04B 17/382; Y02B 60/50; Y02D 70/00
See application file for complete search history.

(56) References Cited

U.S. PATENT DOCUMENTS

| | | | | |
|---|---|---|---|---|
| 7,877,098 B2* | 1/2011 | Ryu | ...................... | H04W 36/30 370/331 |
| 8,724,572 B2* | 5/2014 | Schober | ............... | H04B 7/0626 370/230 |
| 8,750,152 B2* | 6/2014 | Koo | ........................ | H04B 7/024 370/252 |
| 8,983,393 B2* | 3/2015 | Raghavan | ............. | H04W 24/02 455/67.11 |
| 9,002,293 B2* | 4/2015 | Jeong | ................... | H04L 5/0053 370/329 |
| 9,019,893 B2* | 4/2015 | Zhu | ................... | H04W 36/0083 370/328 |
| 9,100,870 B2* | 8/2015 | Yang | ..................... | H04B 7/0626 |
| 9,124,398 B2* | 9/2015 | Lee | ........................ | H04L 5/0053 |
| 9,510,261 B2* | 11/2016 | Chen | ..................... | H04W 36/18 |
| 9,655,021 B2* | 5/2017 | Tie | ........................ | H04W 36/22 |
| 9,667,397 B2* | 5/2017 | Chen | ..................... | H04B 7/0417 |
| 9,820,188 B2* | 11/2017 | Ekemark | ............... | H04W 28/08 |
| 2010/0226327 A1* | 9/2010 | Zhang | ................... | H04B 7/0632 370/329 |
| 2013/0208681 A1* | 8/2013 | Gore | ..................... | H04B 1/7143 370/329 |
| 2013/0242902 A1* | 9/2013 | Liu | ....................... | H04W 24/10 370/329 |
| 2014/0036664 A1* | 2/2014 | Han | ..................... | H04W 24/02 370/230 |
| 2015/0271728 A1* | 9/2015 | Tie | ........................ | H04W 24/10 370/236 |
| 2016/0080997 A1* | 3/2016 | Hu | ..................... | H04W 36/0055 455/442 |
| 2016/0087778 A1* | 3/2016 | Damnjanovic | ....... | H04L 1/0026 370/329 |
| 2016/0212649 A1* | 7/2016 | Chen | ..................... | H04W 24/10 |
| 2016/0212671 A1* | 7/2016 | Ormsub | ................ | H04W 16/32 |
| 2018/0092008 A1* | 3/2018 | Benjebbour | .......... | H04W 48/20 |
| 2018/0098237 A1* | 4/2018 | Kim | ..................... | H04W 24/10 |

OTHER PUBLICATIONS

3rd Generation Partnership Project; Technical Specification Group Radio Access Network; Study on UMTS heterogeneous networks (Release 12). 3GPP TR 25.800 V12.1.0 (Dec. 2013).

3rd Generation Partnership Project; Technical Specification Group Radio Access Network; Multiplexing and channel coding (FDD) (Release 12). 3GPP TS 25.212 V12.1.0 (Dec. 2014).

3rd Generation Partnership Project; Technical Specification Group Radio Access Network; Radio Resource Control (RRC); Protocol specification (Release 12). 3GPP TS 25.331 V12.4.0 (Dec. 2014).

Huawei et al. "Further discussion on offloading and CIO adaptation in Hetnet" 3GPP Draft; R1-142552 Further Discussion on Offloading and CIO Adaptation in Hetnet. 3rd Generation Partnership Project (3GPP). Mobile Competence Centre . • 650 • Route Des Lucioles .• F-06921 Sophia-Antipolis vol. RAN WG1. no. Seoul. Korea; May 19, 2014-May 23, 2014. May 18, 2014 (May 18, 2014).

Huawei et al. "Considerations on CIO adaptation". 3GPP Draft; R1-141672 Considerations on CIO Adaptation. 3rd Generation Partnership Project (3GPP). Mobile Competence Centre; 650. Route Des Lucioles ; F-06921 Sophia-Antipolis Cedex ; France vol. RAN WG1. no. Shenzhen. China; Mar. 31, 2014-Apr. 4, 2014. Mar. 30, 2014 (Mar. 30, 2014).

Huawei et al. "Considerations on offloading enhancements for UEs with ICS capability". 3GPP Draft; R1-150608 Considerations on Offloading Enhancements for UES With ICS Capability. 3rd Generation Partnership Project (3GPP). Mobile Competence Centre; 650. Route Des Lucioles ; F-06921 SOP vol. RAN WG1. no. Athens. Greece; Feb. 9, 2015-Feb. 13, 2015. Feb. 8, 2015 (Feb. 8, 2015).

Ericsson. "View on Network-Assisted Interference Cancellation and Suppression for UMTS".3GPP Draft; R1-150339. 3rd Generation Partnership Project (3GPP). Mobile Competence Centre ; 650. Route Des Lucioles ; F-06921 Sophia-Antipolis Cedex ; France vol. RAN WG1. no. Athens. Greece Feb. 8, 2015 (Feb. 8, 2015).

Ericsson. "Text proposal on offloading solutions for Network Assisted Interference Cancellation and Suppression for UMTS". 3GPP Draft; R1-152086. 3rd Generation Partnership Project (3GPP). Mobile Competence Centre ; 650. Route Des Lucioles ; F-06921 Sophia-Antipolis Cedex; France •vol. RAN WG1. no. Belgrade. Serbia; Apr. 20, 2015-Apr. 24, 2015. Apr. 10, 2015 (Apr. 10, 2015).

* cited by examiner

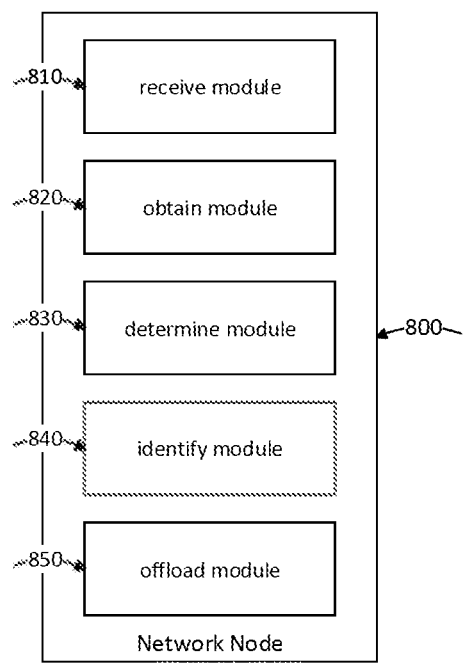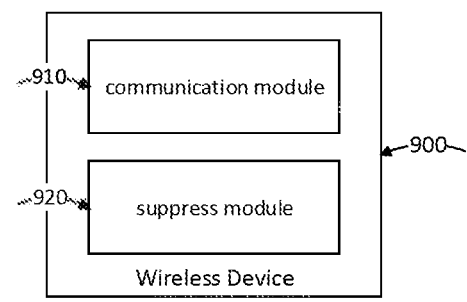
FIGURE 8
FIGURE 9

SYSTEM, METHOD, AND APPARATUS FOR OFFLOADING WIRELESS DEVICES

PRIORITY

This application claims priority to U.S. Provisional Application No. 62/145,555 filed on Apr. 10, 2015, entitled Method and Apparatus to Offload Mobile Terminals in Cellular Networks.

TECHNICAL FIELD

Embodiments presented herein relate in general to wireless communication, and in particular to methods, network nodes, wireless devices, computer programs, or computer program products for offloading a wireless device.

BACKGROUND

In wireless communication systems (e.g., cellular communication systems such as High Speed Packet Access (HSPA)), a wireless device's performance is often limited by the interference levels in the cell in which the wireless device is operating. Interference levels set a limit on the range of operation of the wireless device with respect to the transmitting network node (e.g., a base station, such as a NodeB or an eNodeB). The operation of the wireless device may further be impacted when the traffic load of the cell is high and the network node is unable to provide the desired performance to the wireless device (e.g., in terms of bit rate). Interference can be mitigated by wireless devices that have certain capabilities or features, such as interference suppression or cancellation (IS/IC). Load levels depend on the traffic conditions within the cell. Sometimes, in order to alleviate the traffic within a particular cell it may be desirable to offload one or more wireless devices from the highly loaded cell to a less loaded cell.

In current 3GPP specifications there are Radio Resource Control (RRC) Reporting events or Handover events to trigger the different handover procedures in the Radio Network Controller (RNC). For example, there may arise a situation in which a wireless device is served by one cell, while at the same time, being within the coverage range of another neighboring cell. Based on measurement report(s) requested by the network over RRC (which may be configured on either a periodic or event triggered basis), the network can trigger an active set update or change the wireless device serving cell. For example, in *TS 25.331 Radio Resource Control (RRC); Protocol Specification*, the following "intra-frequency measurement" events are listed:

A. A primary Common Pilot Channel (CPICH) enters the reporting range (add a cell to active set).
B. A primary CPICH leaves the reporting range (remove a cell from active set).
C. A non-active primary CPICH becomes better than an active primary CPICH (replace a cell).
D. Change of best cell.

In addition, the following proposal can help measuring the link quality against a given threshold:

E. A Primary CPICH becomes better than an absolute threshold.
F. A Primary CPICH becomes worse than an absolute threshold.
G. A non-active E-DCH but active DCH primary CPICH becomes better than an active E-DCH primary CPICH.

In addition, there are the following "inter-frequency measurement" events:

A. Change of best frequency.
B. The estimated quality of the currently used frequency is below a certain threshold and the estimated quality of a non-used frequency is above a certain threshold.
C. The estimated quality of a non-used frequency is above a certain threshold.
D. The estimated quality of the currently used frequency is below a certain threshold.
E. The estimated quality of a non-used frequency is below a certain threshold.
F. The estimated quality of the currently used frequency is above a certain threshold.
G. Change of best cell on a configured secondary downlink frequency.

The problem with this set of events is that although it reflects the received power conditions, it overlooks another quantity that is important to the wireless device's performance, namely the channel quality information (CQI). CQI reflects the instantaneous changes in the downlink channel. During the 3GPP study documented on heterogeneous networks in *TR 25.800 Study on UMTS Heterogeneous Networks*, it was recognized that the extra interference margin provided by interference cancellation (IC) could lead to the possibility for the network to offload the IC-enabled wireless device from a macro cell to a lower power node (LPN) within the same cell.

SUMMARY

An object of certain embodiments disclosed herein is to provide for the offloading of a wireless device to a so called second best cell (from the wireless device's perspective). One advantage provided by some embodiments is that the network is able to more evenly distribute the load between cells. This may be achieved by taking advantage of a less loaded neighbouring cell to offload a wireless device from a higher loaded cell. Certain embodiments allow the network to make the decision to offload the wireless device even in the case where traditional cell selection mechanisms would not call for a cell change (e.g., the network may offload a wireless device to a second best cell despite the downlink CPICH power in the second best cell being lower than in the serving cell). This allows the network greater control of its overall load, enabling the cell load to be smoothed out between heavier loaded cells and lighter loaded neighbour cells.

According to certain embodiments, a method for offloading a wireless device comprises identifying a second best cell. The second best cell provides the wireless device with a second wireless signal. The second wireless signal comprises a first signal characteristic that is less than a corresponding first signal characteristic of a first wireless signal provided by a serving cell. The second best cell and the serving cell are separate cells. The method also includes obtaining load information for the serving cell and the second best cell. The method additionally includes offloading the wireless device from the serving cell to the second best cell despite the first signal characteristic of the first wireless signal of the serving cell being better than the first signal characteristic of the second wireless signal of the second best cell.

In some embodiments, the method also includes, prior to offloading the wireless device, determining that a load of the serving cell exceeds a first threshold.

In particular embodiments, the method further includes receiving channel quality information (CQI) reports from the wireless device. The CQI reports comprise an indication of the first signal characteristic of the first wireless signal and of the second wireless signal. In some embodiments, the CQI reports are received on a periodic basis according to a predefined pattern. In certain embodiments, the CQI reports are received on an on-demand basis. In particular embodiments, the CQI reports comprise filtered CQI measurements. In some embodiments, each CQI report comprises a single codeword that represents the CQI reports for both the first wireless signal and the second wireless signal. In particular embodiments, receiving CQI reports comprises receiving a first CQI report for the first wireless signal in a first time slot and a second CQI report for the second wireless signal in a second time slot. The second time slot is a different time slot than the first time slot.

In some embodiments, the wireless device is using a first number of carriers in the serving cell. When CQI reports are received, the CQI reports were prepared as though the wireless device was using a second number of carriers, the second number greater than the first number.

According to particular embodiments, a network node for offloading a wireless device comprises a processor configured to identify a second best cell. The second best cell provides the wireless device with a second wireless signal that has a first signal characteristic that is less than a corresponding first signal characteristic of a first wireless signal provided by a serving cell. The processor is also configured to obtain load information for the serving cell and the second best cell. The network node also includes an interface that is coupled to the processor and configured to transmit a message to initiate offloading of the wireless device from the serving cell to the second best cell. The wireless device is offloaded despite the first signal characteristic of the first wireless signal of the serving cell being better than the first signal characteristic of the second wireless signal of the second best cell.

In certain embodiments, a network node for offloading a wireless device comprises a processor and computer readable storage media. The storage media contains instructions that are executable by the processor. The execution of the instructions causes the network node to be operative to identify a second best cell. The second best cell provides the wireless device with a second wireless signal that comprises a first signal characteristic that is less than a corresponding first signal characteristic of a first wireless signal provided by a serving cell. The network node is further operative to obtain load information for the serving cell and the second best cell. The network node is additionally operative to offload the wireless device from the serving cell to the second best cell despite the first signal characteristic of the first wireless signal of the serving cell being better than the first signal characteristic of the second wireless signal of the second best cell.

In particular embodiments, a network node for offloading a wireless device comprises an identify module configured to identify a second best cell. The second best cell provides the wireless device with a second wireless signal. The second wireless signal has a first signal characteristic that is less than a corresponding first signal characteristic of a first wireless signal provided by a serving cell. The network node additionally comprises an obtain module that is configured to obtain load information for the serving cell and the second best cell. The network node further includes an offload module that is configured to offload the wireless device from the serving cell to the second best cell despite the first signal characteristic of the first wireless signal of the serving cell being better than the first signal characteristic of the second wireless signal of the second best cell.

It is to be noted that any feature of any of the above embodiments may be applied to any other embodiment, wherever appropriate. Likewise, any advantage of any of the embodiments may apply to the other embodiments, and vice versa. Other objectives, features and advantages of the disclosed embodiments will be apparent from the following detailed disclosure, attached claims, and drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Particular embodiments are now described, by way of example, with reference to the accompanying drawings, in which:

FIG. 8 is a block diagram of a network node, according to particular embodiments; and FIG. 9 is a block diagram of a wireless device, according to particular embodiments.

DETAILED DESCRIPTION

Some of the embodiments contemplated by the claims will now be described more fully hereinafter with reference to the accompanying drawings. Other embodiments, however, are contained within the scope of the claims and the claims should not be construed as limited to only the embodiments set forth herein; rather, these embodiments are provided by way of example so that this disclosure will help convey the scope of the inventive concept to those skilled in the art. Like numbers refer to like elements throughout the description.

An object of certain embodiments disclosed herein is to provide for the offloading of a wireless device (herein after WD) to a so called second best cell. The cell may be called second best because from the perspective of the WD, one or more characteristics of the signal from the second best cell may be lower, or worse, than the corresponding characteristic of the serving cell. The difference may be such that the WD would not normally use the second best cell. However, it may be that from the network perspective, it would be better if the WD was offloaded to the second best cell. That is, from the network perspective, the so call second best cell is actually the best cell, at that time, to be serving the WD. For purposes of avoiding confusion, throughout this disclosure, the serving cell will be the cell with which a WD initially communicates and the second best cell with be the cell to which the WD is offloaded. This will continue to be true even after the WD has been offloaded. That is even though the second best cell is now serving the WD, it will still be referred to as the second best cell; similarly, the serving cell will still be referred to as the serving cell even though it is no longer serving the WD.

Yet another object of certain embodiments disclosed herein is to prevent a WD, having been offloaded from the serving cell to the second best cell, from bouncing back to the serving cell since the serving cell may be the best cell, from the WD's perspective. If the WD were to just switch back to the serving cell at the first opportunity, the network would not be able to achieve any appreciable load balancing gains. Furthermore, the network node may then try to offload the WD again (back to the second best cell). Such constant and rapid switching would lead an increase in handovers which, in turn, would create extra signalling and a waste of wireless resources.

Certain embodiments disclosed herein may take advantage of certain advanced capabilities of a WD, such as IS/IC, or Network-Assisted Interference Cancellation and Suppression (NAICS). In some embodiments, the offloading may be based on filtered CQI reports and cell load information about separate neighbouring cells. In certain embodiments, the WD may use a new reporting method for the filtered CQI reports.

Figure 1:
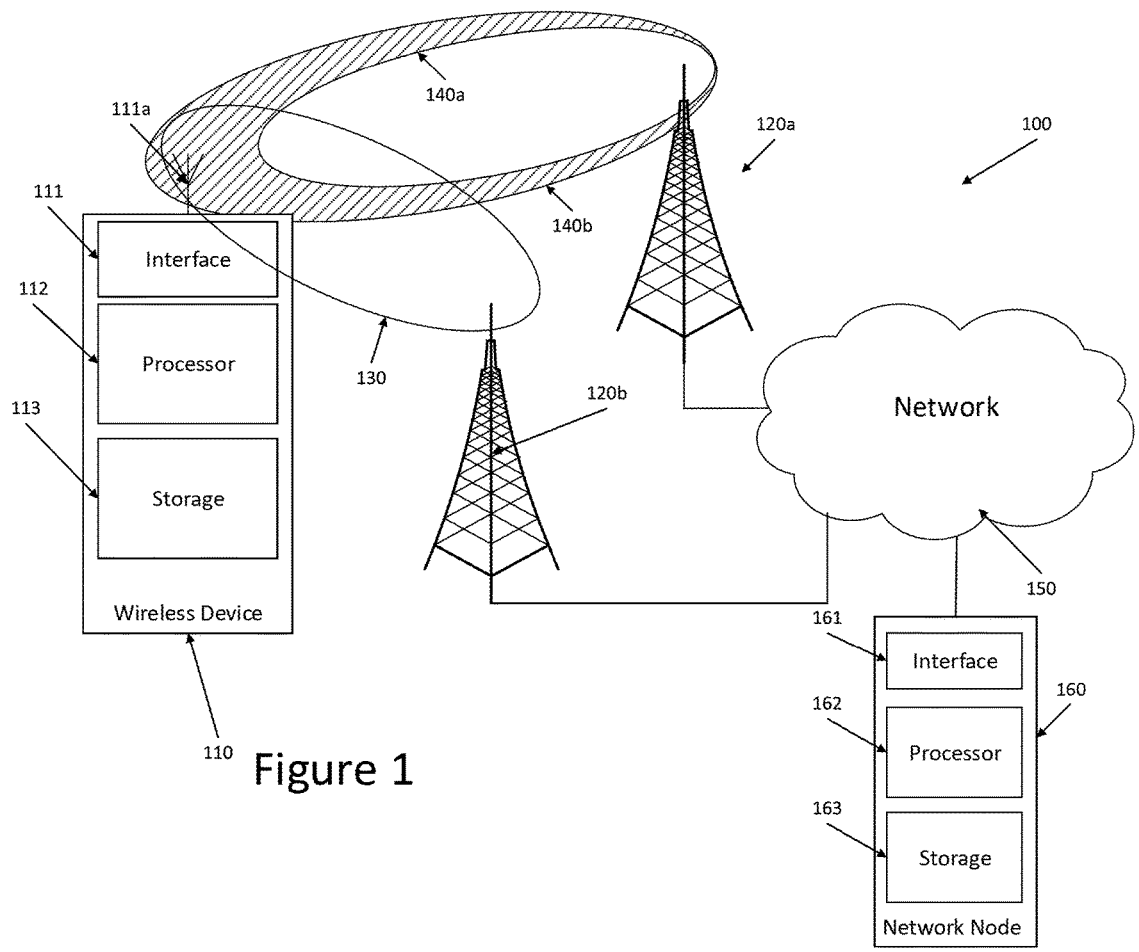
FIG. 1 is a wireless network comprising a more detailed view of certain components of a wireless device and a network node, according to particular embodiments.

FIG. 1 illustrates a wireless network comprising a more detailed view of network node 160 and wireless device (WD) 110, in accordance with a particular embodiment. For simplicity, the embodiment depicted in FIG. 1 only comprises network 150, network node 160, base stations 120a and 120b (collectively and/or generally referred to as base stations 120) and WD 110. Network node 160 comprises processor 162, storage 163, and interface 161. Similarly, WD 110 comprises processor 112, storage 113, interface 111 and antenna 111a. The components of base stations 120 may be similar to the components of network node 160 and are not illustrated for purposes of simplicity. The components of the various devices of network 100 may work together in order to provide a load balanced wireless network that can offload WDs, such as WD 110, to a second best cell. In different embodiments, the wireless network may comprise any number of wired or wireless networks, network nodes, base stations, controllers, wireless devices, relay stations, and/or any other components that may facilitate or participate in the communication of messages and/or signals whether via wired or wireless connections.

Network 150 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices. In addition, network 150 may comprise one or more control nodes (e.g., RNCs, BSCs, etc.), such as network node 160. A control node may be a type of network node that is responsible for managing one or more aspects of one or more other network nodes. A single control node, such as network node 160, may control several base stations 120.

Although network node 160 is used as a control node herein, the term network node is not intended to be limited in such a fashion. A network node may comprise any device used to transfer data or signals between other devices including any routers, switches, base stations, transceivers, controllers, or other network appliances. Focusing on network node 160, network node 160 comprises interface 161, processor 162, and storage 163. These components are depicted as single boxes located within a single larger box. In practice however, a network node may comprises multiple different physical components that make up a single illustrated component (e.g., interface 161 may comprise terminals for coupling wires for a wired connection and a radio transceiver for a wireless connection). As another example, network node 160 may be a virtual network node in which multiple different physically separate components interact to provide the functionality of network node 160 (e.g., processor 162 may comprise three separate processors located in three separate enclosures, where each processor is responsible for a different function for a particular instance of network node 160). Similarly, network node 160 may be composed of multiple physically separate components (e.g., a NodeB component and a RNC component, a BTS component and a BSC component, etc.), which may each have their own respective processor, storage, and interface components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may be considered a single separate network node. In some embodiments, network node 160 may be configured to support multiple RATs. In such embodiments, some components may be duplicated (e.g., separate storage 163 for the different RATs) and some components may be reused (e.g., the same antenna may be shared by the RATs).

Processor 162 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 160 components, such as storage 163, network node 160 functionality. For example, processor 162 may execute instructions stored in storage 163. Such functionality may include providing various wireless features discussed herein to a WD, such as WD 110, including any of the steps or methods disclosed herein. In certain embodiments, processor 162 may be used to determine if, when, and/or where to offload WD 110.

In certain embodiments, processor 162 may be able to identify a second best cell. The second best cell may provide WD 110 a wireless signal having one or more signal characteristics that are less than (as used herein, a signal characteristic that is less than another may generally include a signal characteristic that is not as good as another, where appropriate) the corresponding signal characteristic of a wireless signal from a serving cell. Although the characteristics of the second best cell may be inferior compared to the serving cell, they may still, nonetheless, be sufficient for meeting the communications needs of WD 110 (e.g., WD 110 is NAICS capable and in the extended range of the second best cell). Processor 162 may also be able to obtain load information for the serving cell and the second best cell. The load information may be received from various other network nodes such as base stations 120 or it may be determined locally at network node 160. The load information may be used by processor 162 to determine that the load of a serving cell exceeds a threshold load level. That threshold load level may be unique to network node 160.

Storage 163 may comprise any form of non-transitory volatile or non-volatile computer readable memory including, without limitation, persistent memory, solid state memory, remotely mounted memory, magnetic media, optical media, random access memory (RAM), read-only memory (ROM), removable media, or any other suitable local or remote memory component. Storage 163 may store any suitable instructions, data or information, including software and encoded logic, utilized by network node 160. In some embodiments, storage 163 may store load level data and signal quality data (e.g., CQI reports). The information may be stored and/or maintained in a list, database, or other organization of data useful for determining when a cell is overloaded, when a neighbour cell is under loaded, when a wireless signal form a neighbouring cell is sufficient to be considered a second best cell, etc.

Network node 160 also comprises interface 161 which may be used in the wired or wireless communication of signalling and/or data between network node 160, network 150, and/or WD 110. For example, interface 161 may perform any formatting, coding, or translating that may be needed to allow network node 160 to send and receive data from network 150 over a wired connection. In embodiments in which network node 160 is a base station, such as one of base stations 120, interface 161 may also include a radio transmitter and/or receiver that may be coupled to or a part of an antenna. The radio may receive digital data that is to be sent out to other network nodes or WDs via a wireless connection. The radio may convert the digital data into a radio signal having the appropriate channel and bandwidth parameters. The radio signal may then be transmitted via the antenna to the appropriate recipient (e.g., WD 110). In some embodiments, interface 161 may receive various signal quality reports created by WD 110.

The antenna of, for example, a base station, may be any type of antenna capable of transmitting and receiving data and/or signals wirelessly. In some embodiments, the antenna may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Interface 161 may be coupled to processor 162. Among other things, interface 161 may receive channel quality information (CQI) reports from, for example, WD 110 via, for example, base station 120b. The information may be received in different time slots (as used herein the term time slot may refer to any generic window of time, such as a subframe, a TTI, etc.) for different cells. In some embodiments, it may be received in a single codeword that contains CQI reports from two or more cells. In certain embodiments, if processor 162 determines that, for example, WD 110 is to be offloaded from the serving cell, interface 161 may transmit a message to initiate offloading WD 110. Depending on the device that is making the offload determination, the message may be transmitted to another network node, such as base station 120b, or it may be transmitted to WD 110. The offload may be initiated despite the fact that the serving cell provides better relevant signal characteristics for WD 110.

WD 110 may be any type of wireless endpoint, mobile station, mobile phone, wireless local loop phone, smartphone, user equipment, desktop computer, PDA, cell phone, tablet, laptop, VoIP phone or handset, or smart equipment which is able to wirelessly send and receive data and/or signals to and from a network node, such as base station 120b, and/or other WDs. In some embodiments, WD 110 may be an NAICS or IS/IC capable WD. WD 110 comprises interface 111, processor 112, storage 113, and antenna 111a. Like network node 160, the components of WD 110 are depicted as single boxes located within a single larger box, however in practice a WD may comprises multiple different physical components that make up a single illustrated component (e.g., storage 113 may comprise multiple discrete microchips, each microchip representing a portion of the total storage capacity). Also, in some embodiments, some of the features and/or functions of WD 110 may be performed or located remotely. For example, in some embodiments, storage 113 may include both local storage and remote storage (e.g., cloud based storage).

Processor 112 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 110 components, such as storage 113, WD functionality. Such functionality may include providing various wireless features discussed herein, including any of the steps or methods disclosed herein. For example, in some embodiments, when processor 112 is making certain calculations and comparisons of wireless signals, it may apply an offset to one or more characteristics of the wireless signal from the serving cell and/or the second best cell. The offset may be used to make the serving cell seem less desirable or to make the second best cell seem to be more desirable. In some embodiments, processor 112 may initiate a timer that, while running, prevents WD 110 from returning to the serving cell from which it was offloaded.

One possible way in which processor 112 may prevent WD 110 from immediately returning to the serving cell after it has been offloaded is that once the offload has been executed, processor 112 may apply an offset, for example, to the existing parameter Log $M_{NotBest}$, when evaluating the event "change of best cell" for either of the existing Equation 1 or Equation 2 defined in section 14.1.2.4 of TS 25.331.

Equation 1 (Triggering condition for pathloss):

$$10 \cdot \text{Log } M_{NotBest} + CIO_{NotBest} \leq 10 \cdot \text{Log } M_{Best} + CIO_{Best} - H_{1d}/2,$$

Equation 2 (Triggering condition for all the other measurement quantities):

$$10 \cdot \text{Log } M_{NotBest} + CIO_{NotBest} \geq 10 \cdot \text{Log } M_{Best} + CIO_{Best} + H_{1d}/2,$$

The variables in the formula are defined as follows:
$M_{NotBest}$: is the measurement result of a cell not stored in "best cell" in the variable BEST_CELL_1D_EVENT.
$CIO_{NotBest}$ is the cell individual offset of a cell not stored in "best cell" in the variable BEST_CELL_1D_EVENT.
$M_{Best}$ is the measurement result of the cell stored in "best cell" in variable BEST_CELL_1D_EVENT.
$CIO_{Best}$ is the cell individual offset of a cell stored in "best cell" in the variable BEST_CELL_1D_EVENT.
$H_{1d}$ is the hysteresis parameter for the event 1d.
If the measurement results are pathloss or CPICH-Ec/No then $M_{Not\ Best}$ and $M_{Best}$ are expressed as ratios.
If the measurement result is CPICH-RSCP then $M_{Not\ Best}$ and $M_{Best}$ are expressed in mW.

In certain embodiments, once WD 110 has been offloaded from the serving cell, processor 112 might trigger "change of best cell" event if the conditions for either of these existing Equations are fulfilled after applying the offset. The offset can be introduced to the existing RRC messages, for example, the Active Set Update, RRC Radio Bear Reconfiguration, or implemented at WD 110, if WD 110 is informed that such action should be performed. For example, WD 110 may be informed by an RNC indicator that is sent via RRC from network node 160. The offset may only be applied when WD 110 is offloaded to a second best cell. When WD 110 is handed over under normal circumstances, the regular equation is used without the offset. In some embodiments the offset may only be applied for a specified amount of time. The amount of time may be preconfigured and stored in storage 113. In some embodiments, network node 160 may supply the length of time (e.g., it may vary depending on the load situation at both the serving cell and the second best cell).

In particular embodiments, WD 110 may prevent an immediate return to the serving cell after being offloaded by applying a pre-configured offset for example, to the existing parameter $Q_{NotBest}$, when evaluating the "change of best frequency" event for the existing Equation 1 (denoted as Equation 3, herein) defined in section 14.2.1.1 of TS 25.331.

$$Q_{NotBest} \geq Q_{Best} + H_{2a}/2 \qquad \text{Equation 3:}$$

The variables in the formula are defined as follows:

$Q_{Not\ Best}$ is the quality estimate of a frequency not stored as "best frequency" in the variable BEST_FREQUENCY_2A_EVENT.

$Q_{Best}$ is the quality estimate of the frequency stored as "best frequency" in the variable BEST_FREQUENCY_2A_EVENT.

$H_{2a}$ is the hysteresis parameter for the event 2a in that measurement

In certain embodiments, once WD 110 has been offloaded from the serving cell to the second best cell, WD 110 would trigger "change of best frequency" event if the conditions for this Equation are fulfilled after applying the offset. The offset can be introduced to the existing RRC messages, for example, RRC Radio Bearer Reconfiguration, or implemented at WD 110, if the UE is informed that such action should be performed (e.g. by RNC indicator via RRC). The offset may only be applied when WD 110 is offloaded to a second best cell. When WD 110 is handed over under normal circumstances, the regular equation is used without the offset. In some embodiments the offset may only be applied for a specified amount of time. The amount of time may be preconfigured and stored in storage 113. In some embodiments, network node 160 may supply the length of time (e.g., it may vary depending on the load situation at both the serving cell and the second best cell).

Storage 113 may be any form of volatile or non-volatile memory including, without limitation, persistent memory, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by WD 110. In some embodiments storage 113 may maintain a list, database, or other organization of data that keeps track of the amount of any offsets that have been applied. In some instances, storage 113 may also keep track of how long a particular offset has been applied.

Interface 111 may be used in the wireless communication of signalling and/or data between WD 110 and base station 120*b*. For example, interface 111 may perform any formatting, coding, or translating that may be needed to allow WD 110 to send and receive data from network node 160 over a wireless connection. Interface 111 may also include a radio transmitter and/or receiver that may be coupled to or a part of antenna 111*a*. The radio may receive digital data that is to be sent out to base station 120*b* via a wireless connection. The radio may convert the digital data into a radio signal having the appropriate channel and bandwidth parameters. The radio signal may then be transmitted via antenna 111 to base station 120*b*.

Antenna 111 may be any type of antenna capable of transmitting and receiving data and/or signals wirelessly. In some embodiments, antenna 111*a* may comprise one or more omni-directional, sector or panel antennas operable to transmit/receive radio signals between 2 GHz and 66 GHz. For simplicity, antenna 111*a* may be considered a part of interface 111 to the extent that a wireless signal is being used.

The components above may work together to improve the load balancing between neighbouring cells by allowing a WD to be offloaded to a second best cell, where the second best cell has a lower load than the serving cell. For example, in some embodiments, processor 162 may be configured to identify a second best cell. As mentioned above, the second best cell may provide WD 110 with a wireless signal that has one or more characteristics that are inferior to the corresponding characteristics of the wireless signal from the serving cell (but which is still sufficient to provide WD 110 with a wireless signal that meets the needs of WD 110 (e.g., provides agreed to QoS, bit rate, etc.)). Processor 162 may identify the second best cell based on information provided by WD 110 (via base station 120*b*) that is received by interface 161 and stored in storage 163. For example, in some embodiments interface 161 may receive channel quality information (CQI) reports from WD 110 (via base station 120*b*).

The CQI reports may contain information indicative of various signal characteristics of one or more wireless signals, such as the wireless signals from the serving cell and any other neighbouring cells from which a second best cell may be identified. Depending on the scenario, the CQI reports may be received in a variety of different ways, such as on a periodic basis according to a predefined pattern (e.g., while the wireless signals are received by the WD, the WD may report the CQI(s) in every time slot) or on an on-demand basis (e.g., the WD may report the CQI(s) in specific time slots upon the request of the network). Regardless of when the reports are sent, in some embodiments, the CQI reports may be filtered CQI measurements. The filtering may be done by WD 110 or base station 120*b*. In certain embodiments, each CQI report may comprise a single codeword that comprises the CQI values for the wireless signal from both the serving cell and the second best cell. In some embodiments, interface 161 may receive different CQI reports associated with wireless signals from different cells in different time slots. In particular embodiments, WD 110 may be using a particular number of carriers (e.g., one carrier) in communicating with the serving cell. However, interface 161 may receive CQI reports from WD 110 as though WD 110 was using a larger number of carriers (e.g., 2 carriers). In some instances, the number of CQI reports may be twice the number of carriers actually used by the WD for sending the report. The additional carrier(s) used for reporting CQI values may be used to report CQI values for the second best cell. Using existing signalling for reporting in, for example, dual carrier scenarios, may allow reporting of CQI values for multiple cells without having to create new signalling.

Processor 162 may also be able to obtain load information for the serving cell, the second best cell, and/or any other neighbouring cells that may be of interest. The load information may be stored or maintained in storage 163. Using the load information, processor 162 may be able to determine that a load of the serving cell exceeds a threshold while the load at a second best cell is below a threshold. The threshold may be specific to each cell.

If it is determined that WD 110 should be offloaded from the serving cell to the second best cell, interface 161 may transmit a message to initiate the offloading. In some embodiments, the message may be a handover message transmitted from base station 120b or 120a to WD 110. In other embodiments, for example where network node 160 is making the determination, the message may be transmitted to base stations 120.

Moving now to WD 110, interface 111 may be able to establish an initial communication session with a serving cell provided, for example, by base station 120b. During the communication session interface 111 may receive wireless signals from other cells such as a second best cell provided, for example, by base station 120a. Processor 112 may use the characteristics of the wireless signals to prepare reports that may be sent to network node 160. The reports may include, for example, information about the signal strength of a Common Pilot Channel signal or a frequency quality of the wireless signal. Interface 111 may transmit the reports to a network node, such as network node 160.

Based on the reports, network node 160 may decide to offload WD 110 from the serving cell to a second best cell. In being offloaded, interface 111 may establish a wireless communication session with the second best cell. This may involve a standard handover procedure from base station 120b (supporting serving cell 130) to base station 120a (serving second best cell 140). Once WD 110 has been offloaded or handed over to the second best cell, it may be desirable prevent WD 110 from returning to the serving cell at the next available opportunity. To achieve this, in some embodiments, processor 112 may suppress one or more aspects of one or more handover triggering events. In some embodiments, this may comprise adding an offset to improve the perceived quality of the wireless signal (when used in cell selection calculations) from the second best cell. In certain embodiments, suppressing an aspect of one or more handover triggering events may comprise adding an offset to degrade the perceived quality of the wireless signal from the serving cell. In some embodiments, suppressing an aspect of one or more handover triggering events may comprise processor 112 initiating a timer that prevents a handover back to the serving cell for the duration of the timer. In some embodiments, the timer may determine how long an offset is applied. In particular embodiments, the suppression may comprise interface 111 sending a suppression message to a network node, such as network node 160. The suppression message may indicate to the recipient that WD 110 has been offloaded to a second best cell (with inferior, but still acceptable, signal characteristics) but that it does not want to be handed back over to the serving cell (with superior signal characteristics).

In addition to the hardware components of FIG. 1, there is also illustrated a particular scenario comprising two cells, serving cell 130 and second best cell 140 (second best cell 140 comprises normal range 140a and extended range 140b). As may be inferred from the names, WD 110 is in communication with base station 120b in serving cell 130. The communication between WD 110 and base station 120b may be via a High Speed Downlink Packet Access (HSDPA) link. It may be assumed that serving cell 130 and second best cell 140 are in the same active set for WD 110. It may also be assumed that WD 110 is IS/IC and/or NAICS capable. In some scenarios, the IS/IC or NAICS capability may be what allows the signal quality in extended range 140b to be of an acceptable quality. It may also be assumed, for the following scenario, that the load in serving cell 130 has reached a point where it may be desirable to offload WDs if a suitable candidate can be found (e.g., the load in serving cell 130 exceeds a threshold load level). In this scenario, WD 110 is a suitable candidate for offloading. Network node 160 and WD 110 may then receive and/or process information and make a decision to offload WD 110 from serving cell 130 to second best cell 140.

In order for network node 160 to identify a need to offload a WD from a particular cell, and determine which WDs to select for the offloading, network node 160 may need certain information. For example, network node 160 may need information on the load situation of the serving cell and the second best cell. This information may be received from one or more other network nodes, or it may be determined based on information/data maintained by network node 160. This information may be readily available and/or ascertainable. Network node 160 may also need information on the link quality for the WDs in the serving cell. The link quality information may relate to both the serving cell and the second best cell. For example, network node 160 may collect downlink transmit power C-PICH measurements and/or path-loss estimates information from cells in the active set and can use this information to estimate which WDs can be offloaded while still receiving acceptable signal quality and whether offloading will improve the load balance in the network.

Link quality information for HSDPA is typically given by Channel Quality Information (CQI). Downlink CQI may be calculated by processor 112 of WD 110 based on CPICH measurements. Interface 111 may then send the information to base station 120b. Depending on the embodiment, base station 120b may keep and use this information itself to make the offloading decision or it may forward it on to another network node, such as a control node (e.g., network node 160. In some embodiments it may be forwarded via HS-DPCCH. In some embodiments, link quality information (e.g., an estimate of the link quality, based on CQI measurements) may be included from the serving cell as well as the second best cell. In certain embodiments link quality information for additional cells, such as the second best cell, may also be included.

In many scenarios, the link quality information provided by CQI is short term and varies on a TTI basis. In order to provide a more stable offloading mechanism, the instantaneous measurements and corresponding reports may be smoothed over a period of time. This may help reduce the likelihood of creating a scenario where a wireless device gets offloaded back and forth with each change in the channel situation (or the observed channel situation). The risk of ping-ponging between cells may be further improved by processor 112 of WD 110 suppressing, or otherwise altering, the link quality of the serving cell, the second best cell, or both when performing various calculations related to handover and cell selection so that it appears that the second best cell is the best cell.

Depending on the embodiment, base stations 120, network node 160, or WD 110 may be responsible for selecting the second best cell. For example, network node 160 may list and rank (with respect to their load, but excluding the serving cell) one or more cells in WD's 110 active set. The cell with the lowest load ranks first, the cell with the next lowest load ranks second, etc. In some embodiments, every cell within the wireless device active set is considered. Then, any cell for which WD 110 does not have a CPICH power above a certain threshold (referred to as thresholdCPICH-bestCellSelect) is removed or excluded from the list. The cell with the lowest load and acceptable CPICH is selected as the second best cell. The choice of the signal quality threshold can be done in a number of ways. One choice is to have the threshold equal to the serving cell's quality (e.g., CPICH power) minus a percentage (e.g., 10 percent). In some embodiments, the percentage may be optimized by field measurements to figure out how many cells are within a given percentage. In particular embodiments, the threshold thresholdCPICHbestCellSelect may have a value that is configurable by the service provider and relayed through network 150.

In certain embodiments, network node 160 may notify WD 110 of the selected cell (e.g., via an active set update message). In some embodiments, a list of the potential second best cells are selected and communicated to WD 110.

As another example, WD 110 may measure a filtered CQI for one or more cells in the wireless device active set, except the serving cell. The measured cells are listed and ranked. The cell with the best filtered CQI ranks first, the one with the next best filtered CQI ranks second, etc. In some embodiments, every cell within the wireless device active set is considered. Then, any cell for which WD 110 does not have a CQI above a certain threshold, referred as threshold-CQIbestCellSelect, is removed or excluded from the list. The cell with best CQI in the list (the remaining cell with the highest rank) is selected as the second best cell. Other embodiments may use various combinations of the above for ranking, filtering, and selecting cells.

If it is assumed, in this scenario, that WD 110 is responsible for selecting the second best cell, interface 111 may send a message to network node 160 to notify it of the selected cell. The threshold value thresholdCQIbestCellSelect may have a numeric value associated therewith that may be configurable by the network and has been communicated to WD 110 (e.g., via RRC Radio Bearer Reconfiguration message). In certain embodiments, a list of the potential second best cells may be selected and communicated to network node 160.

In current wireless communication systems, CQI reports are delivered to network node 160 on a periodic basis that may be controlled by the CQI feedback cycle. In certain embodiments, the second-best cell CQI values can also be transmitted to network node 160 periodically under a pre-established pattern. In certain embodiments the CQI reports may be provided on-demand, upon request, upon a triggering event, or upon any other need basis.

As mentioned before, the link information from CQI reports is short term and can vary on a TTI basis. In some embodiments, the measurements may be smoothed over a longer period to help provide a more stable offloading mechanism. This may help to avoid creating a scenario where a wireless device gets offloaded back and forth with every change in the channel situation. In some embodiments, the link quality information for offloading purposes may be computed based on filtered CQI measurements (e.g., either directly by WD 110, or after reception by network node 160), with a configurable averaging period. In certain embodiments, the configuration of the averaging period may be communicated either to WD 110 (e.g., via RRC) or to network node 160 (e.g., via NBAP, NBAP is the protocol for signalling between UTRAN RNC and NodeB over Iub interface) depending on what device is doing the computing.

Figure 2:
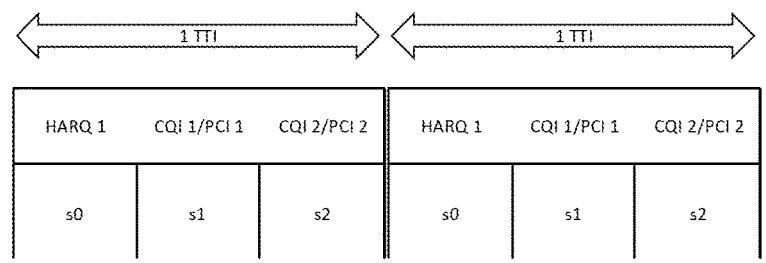
FIG. 2 depicts the format of a sub-frame, according to particular embodiments.

Depending on the embodiment, scenario, and/or capabilities of the devices involved, there are a variety of different ways for the CQI values to be reported. For example, in some embodiments, WD 110 may produce the link quality information itself (e.g., processor 112 computes a filtered CQI measurement) and then reports the link quality information in the form of filtered CQI for both the serving cell and the second best cell. The report for the second best cell can be sent using a pre-configured period between reports for the serving cell, or instead follow a request from, for example, network node 160. As another example, in certain embodiments, the serving cell CQI is transmitted on HS-DPCCH along with Hybrid Automatic ReQuest (HARQ) and PCI information. One possibility is to send the new filtered CQI information associated with the serving cell and the second best cell in the TTI using a format similar to what HS-DPCCH uses when configured with dual carrier HSPA (see 4.7.3 in TS 25.212). As shown in FIG. 2, certain embodiments may adopt a subframe format with slot 0 containing HARQ for the serving cell, while slots 1 and 2 convey the link quality information for the serving cell and the second best cell.

Depending on the embodiment, the link quality information for both cells may be reported, for example, using 1 time slot (e.g., one subframe) for each cell (10 bit coding) or by creating a unique codeword for the CQI values for both cells that covers the two slots (20 bit coding). The encoding procedure explained in TS 25.212 subclause 4.7.3.2 could be reused here to implement the encoding.

Figure 3:
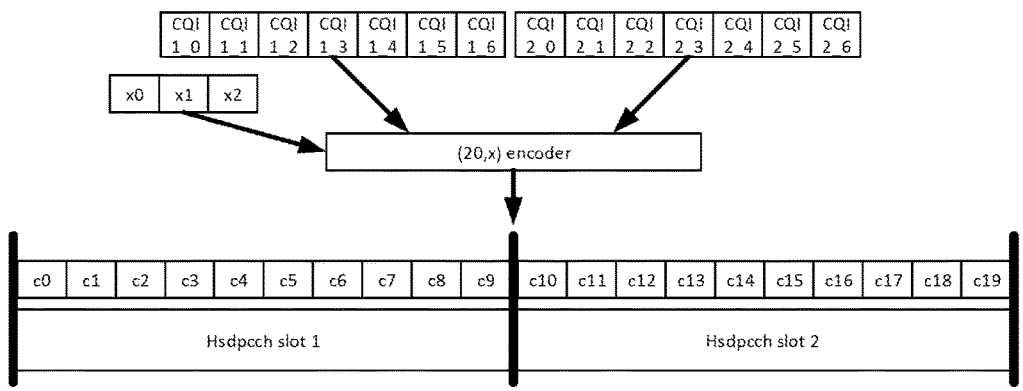
FIG. 3 depicts a mapping of filtered CQI values, according to particular embodiments.

In some embodiments, in order to add second best cell identification, a 3-bit pattern (X0-X2) may be appended, the three bits corresponding to the cell index of the second best cell in the active set list. This can be seen in FIG. 3 which illustrates an example of the mapping for the filtered CQIs for both the serving cell and the second best cell as well as the second best cell ID to a single 20 bit codeword. Other mapping and coding solutions are possible. The solution used may vary depending on network deployment, such as the number of cells in an active set.

Figure 4:
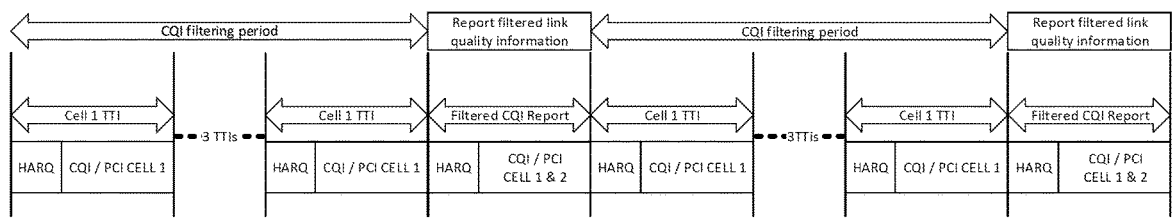
FIG. 4 is a mapping of a HS-DPCCH transmission of filtered CQIs, according to particular embodiments.

FIG. 4 illustrates an example of a HS-DPCCH transmission of filtered CQIs reported at an interval of 6 TTIs. When the filtered CQI is not reported, the regular HARQ, CQI and PCI reporting is done for the serving cell using the appropriate subframe format. The reporting interval may be a configurable parameter.

There are a variety of different options and considerations that may be weighed when making a decision as to whether or not a particular WD can be offloaded from a serving cell to a second best cell. For example, in some embodiments, in order for a WD to be offloaded, the load in the serving cell may need to exceed a predetermined load threshold. This threshold may be local and specific to the cell. This threshold may be referred to as HighloadThreshold. Exceeding this threshold may be a good indication that this cell needs to have some of its load offloaded. Similarly, the load in the second best cell may need to be less than a predetermined load threshold. This threshold may be referred to as High-loadThreshold. This threshold may be local and specific to the second best cell. Being under this threshold may be a good indication that the cell has capacity to take on additional load. The thresholds for different cells may have different values, and thus the threshold values for the serving cell and the second best cell may vary. Moreover, in some embodiments, the value of the threshold for a particular cell may be different when determining if it is overloaded than when determining if it has capacity to take on additional load.

In certain embodiments, in addition to considering the respective load capacities, in order to offload the WD, the WD needs to be within range of an alternate cell such that the alternate cell can provide an adequate signal. For example, in some scenarios, the base stations may be situated such that a WD may need to be IS/IC or NAICS capable in order to receive an adequate signal from the second best cell. As another example, the link quality for the second best cell may need to be meet or exceed a certain threshold.

As another example, in certain embodiments, a WD may be offloaded if the filtered CQI in the second best cell exceeds the CQI in the serving cell; or if the filtered CQI for the second best cell exceeds a predefined threshold (e.g., ThresholdOffloadCell2a). Another factor in this example is that the filtered CQI in the second best cell exceeds another predefined threshold ThresholdOffloadCell2b; and the load in the second best cell is lower than the load in the serving cell and under a predefined threshold LowLoadThreshold.

In some scenarios involving an IS/IC capable WD, filtered CQI may refer to the measured and filtered CQI values after interference cancellation/suppression has been applied.

Depending on the embodiment and scenario, cell load may refer to a variety of different things. For example, load may be based on usage of the channel elements, the downlink power, the code, etc. More specifically, load may be the percentage of total downlink transmitted power with respect to the maximum downlink transmitted power.

Returning to FIG. 1, when interface in of WD 110 sends the CQI reports, for example, in HS-DPCCH (whether filtered by WD 110 before sending or by network node 160), base station 120b may forward, or otherwise convey, the filtered CQI to network node 160. In certain embodiments, a new measurement may be used. The new measurement may allow, for example, interface 161 to send a request to base station 120b indicating that base station 120b should send reports either periodically or upon a triggering event. Base station 120b may collect the CQI values reported from WD 110 and report the results to network node 160 in the new measurement. In some embodiments, an interface of base station 120b may forward the CQI values to network node 160. Processor 162 may then further process the received CQI values or reports. In particular embodiments, interface 161 may provide base station 120b with CQI threshold values. When a processor of base station 120b determines that one or more criterion based on the threshold values is met, its interface may send an indication to network node 160. Processor 162 may then further consider the cell load situation and make an offloading decision.

In certain embodiments, instead of using on HS-DPCCH, a new RRC measurement may be used. This may allow WD 110 to report the filtered CQI, or a combination of filtered CQI, path loss, CPICH measurements to a network node making offloading decisions, such as network node 160. For example, network node 160 may provide one or more threshold parameters to WD 110. These threshold parameters may help processor 112 identify candidate second best cells that may be good enough to be considered for offloading. In some embodiments, processor 112 and interface 111 of WD 110 may perform the measurements for the cells on its own (e.g., the cells in the active set, or the cells in the monitoring set or detected set). In some embodiments, interface 111 may receive a message specifying specific cell(s) to monitor and measure. Interface 111 may then provide the measurements to base station 120b which may then pass them along to network node 160. Network node 160 may then use the knowledge of the reported measurements and/or cell load situation to make a decision for the offloading. Once the offloading decision is made, existing procedures may be used to perform the offloading. In some embodiments, a special HS-SCCH order may be used to trigger the serving cell change. In some instances, if WD 110 receives the special HS-SCCH order, it may know that it is being changed for network load reasons and that it should start to suppress one or more factors for one or more handover triggering events to avoid returning to the serving cell at the next available opportunity.

Figure 5:
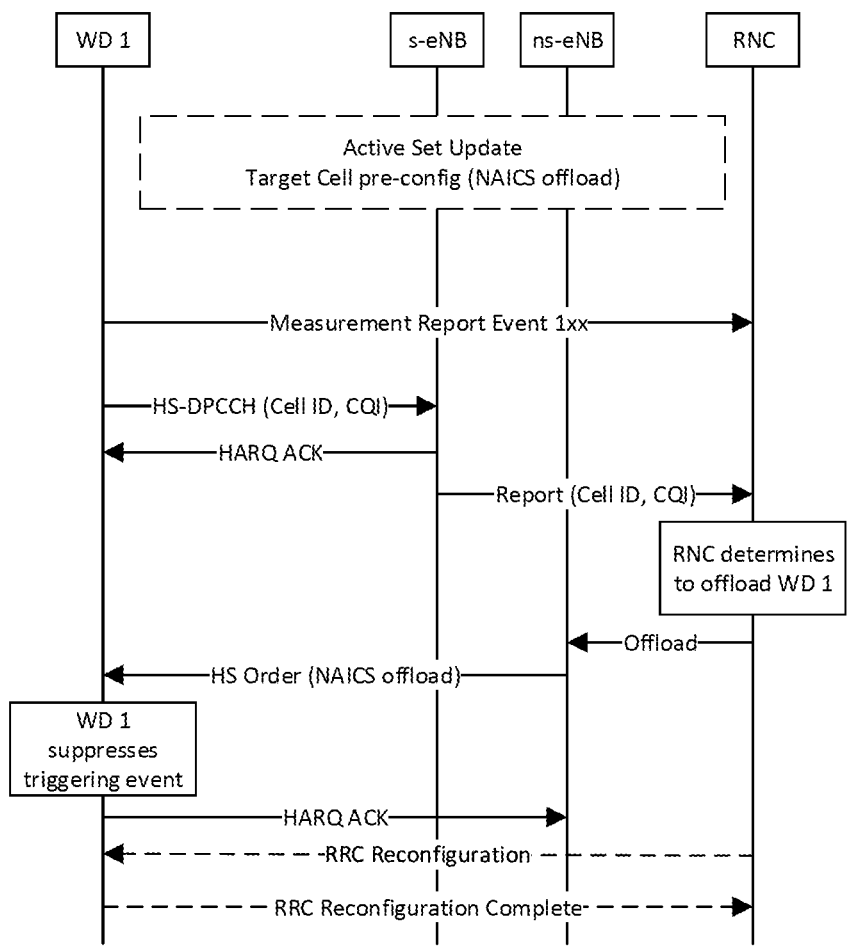
FIG. 5 is a signalling diagram illustrating a particular offload scenario, according to particular embodiments.

FIG. 5 is a signalling diagram illustrating a particular offload scenario, in accordance with a particular embodiment. In this example, WD 1 is initially in a communication session with a serving cell provided by network node s-eNB. WD 1 has identified a potential candidate second best cell provided by ns-eNB. Network nodes ns-eNB and s-eNB are all part of the active set. The first message in this signalling diagram is measurement report event 1xx. In some embodiments, this may be a new event (e.g., a new event to provide information about a second best cell). In certain embodiments, HS-DPCCH may be used to report the CQI values for the serving cell and the second best cell.

Having received the CQI reports from WD 1, network node RNC may determine that WD 1 should be offloaded from the serving cell to the second best cell. Accordingly, network node RNC sends an offload message to network node ns-eNB alerting it that it is to take in WD 1. In response, network node ns-eNB sends a new message HS Order (NAICS offload) to WD 1. This message signals to WD 1 that it is being offloaded to the second best cell provided by network node ns-eNB. This message also signals to WD 1 that it should suppress one or more handover triggering events to prevent WD 1 from returning to the serving cell (provided by network node s-eNB, with its better signal) at the next available opportunity. At approximately the same time that WD 1 suppresses the triggering event, it may also send HARQ ACK message to network node ns-eNB acknowledging that it is being offloaded to the second best cell. This may then be followed by a standard exchange of messages, shown generally as the two RRC Reconfiguration messages, between the relevant devices to handover WD 1 from the serving cell to the second best cell.

Figure 6:
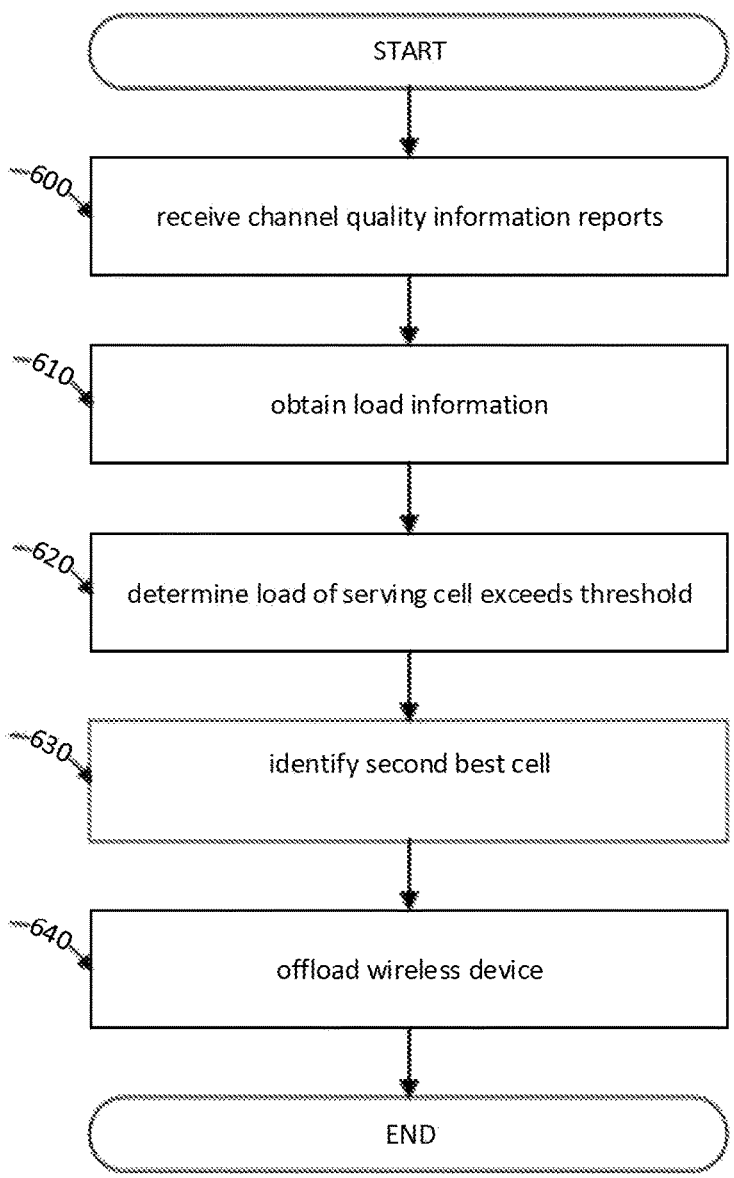
FIG. 6 is a flowchart showing a method used to offload a wireless device, according to particular embodiments.

FIG. 6 is a flowchart showing a method used to offload a WD, in accordance with a particular embodiment. In this method it may be assumed that a WD has an ongoing communication session with a serving cell. Although the steps illustrated in the flowchart focus on the actions of a particular network node, such as network node 160, other components and devices (e.g., WD 110 and/or base stations 120) may be involved in different steps.

The depicted method begins at step 600 with the reception of at least one channel quality information (CQI) report. In other embodiments, other link quality information may be received by the network node. The CQI report may include filtered CQI values for both the serving cell and a second best cell. For example, in some embodiments, both CQI values may be contained in a single codeword. Alternatively, the CQI report may include separate reports with unfiltered CQI values for the serving cell and the second best cell. For example, the separate reports may be received in different time slots. The CQI report may be received from a WD via another network node, such as a base station or eNB. In some embodiments, the report may be received as part of a periodic update that follows a particular pattern that is known by at least the WD and the network node. In certain embodiments, the report may be received in response to the WD or network node detecting some triggering event (e.g., signal quality of the second best cell exceeding a threshold). In some embodiments, the reports may be received in response to a request sent by the network node. In some embodiments, the CQI report may be received as though the WD were using a greater number of carriers than it is actually using. For example, if the WD is using a single carrier, it may provide CQI reports as though it were operating in a dual carrier configuration. The CQI report for the serving cell being reported as one of the dual carriers and the CQI report for the second best cell being reported as the other carrier (even though the second best cell is not in fact being used by the WD when it sends the report).

At step 610 load information is obtained for the serving cell and one or more other cells, including the second best cell. In some embodiments, the network node may obtain load information for all the cells in the active set associated with the WD. In some embodiments, it may obtain load information for the serving cell and a certain number of potential target cells (e.g., the three cells with the best signal quality, aside from the serving cell).

At step 620 it is determined that the load of the serving cell has exceeded a threshold load amount. The threshold load amount may be specific to that particular serving cell. The threshold load amount may be based on any of a variety of different factors such as the percentage of power used.

At step 630 a second best cell is identified. The second best cell will have a wireless signal having one or more signal characteristics that are inferior compared to the same signal characteristic of the wireless signal from the serving cell. In particular embodiments, the signal characteristics may be those signal characteristics (e.g., frequency quality of the wireless signal, a signal strength of a Common Pilot Channel signal, etc.) that are typically used for determining when to switch cells under normal load conditions. The second best cell may also have a lower load than the serving cell. In some embodiments, identifying the second best cell may also comprise determining that the load of the second best cell is below a threshold level.

At step 640, the WD is offloaded from the serving cell to the second best cell. The WD is offloaded despite the serving cell having better relevant signal characteristics than the second best cell. The actual mechanism for the offload may comprise traditional handover procedures.

Figure 7:
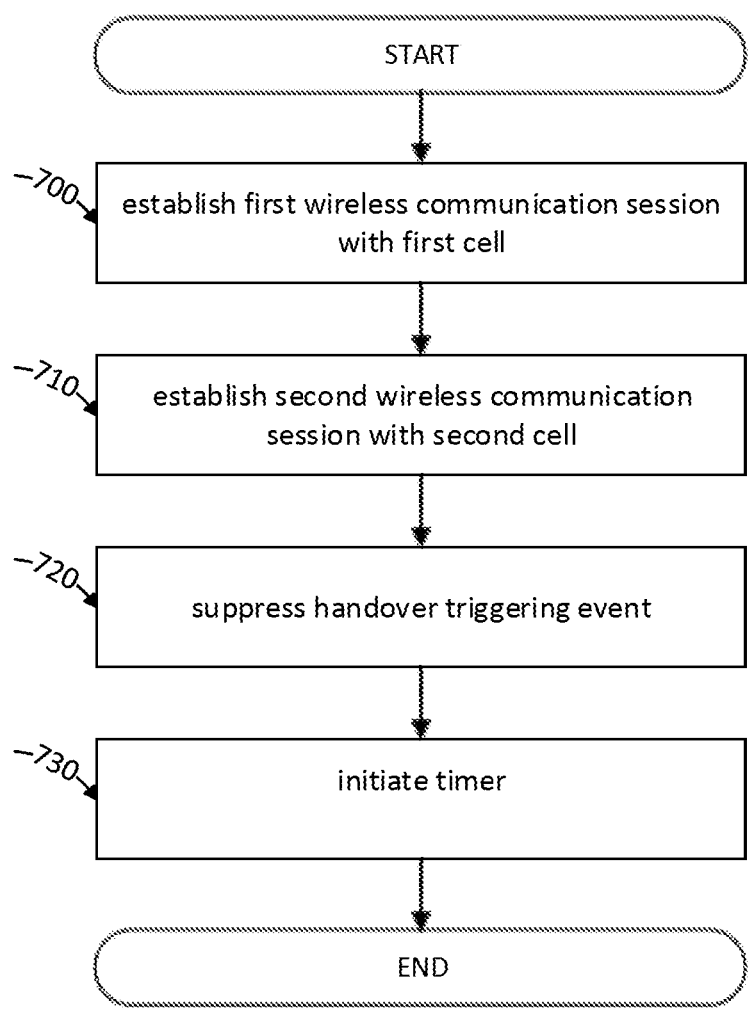
FIG. 7 is a flowchart showing a method used to prevent offload return, according to particular embodiments.

FIG. 7 is a flowchart showing a method used to prevent a wireless device from returning to the serving cell at the first opportunity, in accordance with a particular embodiment. Although the steps illustrated in the flowchart focus on the actions of a WD, such as WD 110, other components and devices (e.g., base stations 120 or network node 160) may be involved in different steps.

The depicted method begins at step 700 with the WD establishing a first wireless communication session with a first cell. The first cell may be the serving cell. The type of communication session that is established, and the process for doing so, may depend on the underlying architecture and wireless technology involved. For purposes of simplicity, for this flowchart, it may be assumed that the communication session is based on 3GPP standards and technologies, such as HSDPA. It may also be assumed that the first cell is the serving cell because it is able to provide the WD with the best signal. This may be based on one or more signal characteristics (e.g., signal strength of a Common Pilot Channel signal, frequency quality of the wireless signal, etc.) of the wireless signal associated with the first cell, as observed and measured by the WD.

At step 710, the WD establishes a second wireless communication session with a second cell. The second cell may be the second best cell. The type of communication session for the second wireless communication session may be the same as the first wireless communication session. It may be assumed that the second cell is the second best cell because it is not able to provide the WD with the best signal. That is, one or more relevant signal characteristics (e.g., signal strength of a Common Pilot Channel signal, frequency quality of the wireless signal, etc.) may, as observed by the WD, be better for the wireless signal associated with the first cell. The second wireless communication session replaces the first wireless communication session. That is, the WD is offloaded from the first cell to the second cell and thus changes communication sessions accordingly.

At step 720, the WD suppresses one or more handover triggering events to prevent a handover from the second cell back to the first cell. The type and method of suppression may vary depending on the embodiment and scenario. For example, in some embodiments, suppressing a handover triggering event may comprise adding an offset value to the measured signal characteristic of the second cell. This would have the effect of making the wireless signal from the second cell appear to be better than it actually is. Similarly, as another example, suppressing a handover triggering event may comprise adding an offset value to the measured signal characteristic of the first cell. This would have the effect of making the wireless signal from the first cell appear to be worse than it actually is. In some embodiments, suppressing a handover triggering event may comprise applying an offset to one or more signal characteristics of both the first cell and the second cell. The offset(s) may be applied to the respective signal characteristics whenever they are used in any of the functions or calculations used in cell selection and/or handover decision making (e.g., any of the equations mentioned herein).

As another example, in some embodiments, suppressing the handover triggering event may comprise sending a suppression message to a network node, such as a network controller. The suppression message may indicate to the network node that the WD has been offloaded and that the network node should prevent a hand over of the WD from the second cell back to the first cell.

At step 730 the WD initiates a timer. The timer may be initiated substantially in parallel with the application of the suppression of the handover triggering event. The timer may be used to limit the length of time for which an offset may be applied. That is, the offset applied at step 720 may continue to be applied until the timer runs out. At which point, the offset will no longer be applied. The length of the timer may vary depending on the load of the respective cells.

The steps described above are merely illustrative of certain embodiments. It is not required that all embodiments incorporate all the steps above nor that the steps be performed in the exact order depicted in FIG. 6 or 7. For example, in some embodiments, the second best cell may be identified prior to determining that the load of the serving cell exceeds a threshold. This may be suitable for a scenario in which the network node making offloading decisions pre-determines where to offload WDs if a particular network node becomes overloaded. Furthermore, some embodiments may include steps not illustrated in FIG. 6 or 7. For example, in some embodiments, the network node making the offloading decision may, in addition to offloading the WD, initiate a timer that may prevent the WD from returning to the serving cell while the timer is running. As another example, in some embodiments, the WD may receive a message indicating that it is being offloaded for load reasons. This may alert the WD that this is not a normal cell change and that it should suppress one or more handover triggering events.

The steps illustrated in FIGS. 6 and 7, and described above, may be performed through a computer program product that may, for example, be executed by the components and equipment illustrated in FIG. 1. For example, storage 163 may comprise computer readable media on which a computer program can be stored. The computer program may include instructions which cause processor 162 (and any operatively coupled entities and devices, such as interface 161 and storage 163) to execute methods according to embodiments described herein. The computer program and/or computer program product may thus provide a means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processor 162, possibly in cooperation with storage 163. Processor 162 and storage 163 may thus be arranged to allow processor 162 to fetch instructions from storage 163 and execute the fetched instructions to allow the respective functional module to perform any steps or functions disclosed herein.

FIG. 8 is a schematic block diagram illustrating the functional modules used in offloading WDs, according to particular embodiments. In particular, there is depicted the functional modules of a particular network node 800. Other embodiments may include more, fewer, or different functional modules. Moreover, a single depicted module may represent multiple similar modules. For example, determine module 830 may represent a first determine module configured to determine the load in a serving cell has exceeded a threshold; and a second determine module configured to determine which cell may be a suitable second best cell. The modules may comprise software, computer programs, sub-routines, libraries, source code, or any other form of executable instructions that are run by, for example, a processor. In this FIG. 8, network node 800 comprises receive module 810, obtain module 820, determine module 830, identify module 840 and offload module 850.

Receive module 810 may be configured to receive link quality information, such as CQI reports from one or more WDs. The CQI reports may comprise an indication of the signal characteristics of one or more cells within range of the one or more WDs. In some embodiments the CQI reports comprise filtered CQI reports or measurements. In certain embodiments, the CQI reports may be contained in a single codeword (e.g., a 20-bit codeword) that represents CQI reports from both a serving cell and a second best cell. Depending on where network node 800 is (e.g., a base station, such as an eNB or a control node, such as an RNC) the CQI reports may be received directly from the respective WDs or they may be conveyed, directly (e.g., via forwarding) or indirectly (e.g., via a new message), from another network node. Depending on the embodiment, the CQI reports may be received on a periodic basis according to a predefined pattern; on an on-demand basis (e.g., in response to a request or upon occurrence of some triggering event). In certain embodiments the CQI reports may be received such that a first CQI report for the serving cell is received in a first time slot and a second CQI report for the second best cell is received in a second time slot that is different than the first time slot. In some embodiments, the CQI reports may be received as though the WD generating the reports was using more carriers than it actually was using. For example, if the WD is using a single carrier, it may report the CQI values as though it was using dual carriers, wherein the CQI for the serving cell would be one of the carriers and the CQI for the second best cell would be the other carrier.

Obtain module 820 is configured to obtain load information for at least two neighbouring cells, one of the cells being a serving cell for a WD and the other being a second best cell for the same WD. In some embodiments, obtain module 820 may obtain load information from reports or other data received from other network nodes. In certain embodiments, obtain module 820 may obtain load information from analysing data already available to network node 800.

Determine module 830 is configured to determine that a load of the serving cell exceeds a threshold. Determine module 830 may also be configured to determine that a load of a second best cell is below a threshold.

Identify module 840 is configured to identify a second best cell. The second best cell may be providing the wireless device with a wireless signal having at least one signal characteristic that is inferior to a corresponding signal characteristic of the wireless signal from the serving cell.

Offload module 850 is configured to offload the wireless device from the serving cell to the second best cell. The WD is offloaded despite the second best cell not having the best signal.

FIG. 9 is a schematic block diagram illustrating the functional modules used in preventing offload return, according to particular embodiments. In particular, there is depicted the functional modules of WD 900. Other embodiments may include more, fewer, or different functional modules. Moreover, a single depicted module may represent multiple similar modules. The modules may comprise software, computer programs, sub-routines, libraries, source code, or any other form of executable instructions that are run by, for example, a processor. In this FIG. 9, WD 900 comprises communication module 910 and suppress module 920.

Communication module 910 is configured to establish a first wireless communication session with a first cell. The first cell provides the WD with a first wireless signal that has a first value for a first signal characteristic. Communication module 910 is also configured to establish a second wireless communication session with a second cell. The second cell replaces the first cell. That is, WD 900 has been offloaded from the first cell to the second cell. In some embodiments, WD 900 may receive a message indicating that it is being offloaded to the second cell. The second cell provides the wireless device with a second wireless signal that has a second value for the first signal characteristic. The second value is less than the first value, that is, the second signal is not as good as the first signal from the perspective of the WD. The value of the respective signals may be determined using traditional techniques for measuring and/or quantifying signal characteristics. In certain embodiments, the first signal characteristic comprises a signal strength of a Common Pilot Channel signal. In some embodiments the first signal characteristic comprises a frequency quality of the respective wireless signals.

Suppress module 920 is configured to suppress a handover triggering event to prevent a handover from the second cell back to the first cell. The handover triggering event that is suppressed may be based on one of the events listed in the background section herein. In some embodiments, suppressing the handover triggering event comprises adding an offset to the second value. The offset may improve the second value. This may have the effect that when the second value is used in handover or cell selection calculations, the second cell appears to be better than it actually is. In certain embodiments, suppressing the handover triggering event comprises adding an offset to the first value. The offset may degrade the first value. This may have the effect that when the first value is used in handover or cell selection calculations, the first cell appears to be worse than it actually is. In particular embodiments, suppressing the handover triggering event comprises initiating a timer. The timer limits a length of time for which an offset may be applied to the first value or the second value. In certain embodiments, suppressing the handover triggering event comprises sending a suppression message. The suppression message causes a network controller to prevent a hand over of the wireless device from the second cell back to the first cell.

In view of the above disclosure, at least some of the herein disclosed embodiments may be summarized as providing a mechanism to offload certain WDs from a highly loaded cell to a separate neighbouring cell that has a lighter load. Once offloaded, the WD may suppress one or more handover triggering events to prevent being handed back over to the serving cell. Certain aspects of the inventive concept have mainly been described above with reference to a few embodiments. However, as is readily appreciated by a person skilled in the art, embodiments other than the ones disclosed above are equally possible and within the scope of the inventive concept, as defined by the appended claims. Similarly, while a number of different combinations of components, devices, and features have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

The invention claimed is:

1. A method for offloading a wireless device, the method comprising:
 identifying a second best cell, the second best cell providing to the wireless device a second wireless signal comprising a first signal characteristic less than a corresponding first signal characteristic of a first wireless signal provided by a serving cell;
 obtaining load information for the serving cell and the second best cell; and
 offloading the wireless device from the serving cell to the second best cell despite the first signal characteristic of the first wireless signal of the serving cell being better than the first signal characteristic of the second wireless signal of the second best cell.

2. The method of claim 1, further comprising, prior to offloading the wireless device, determining that a load of the serving cell exceeds a first threshold.

3. The method of claim 1, further comprising receiving channel quality information (CQI) reports from the wireless device, the CQI reports comprising an indication of the first signal characteristic of the first wireless signal and the first signal characteristic of the second wireless signal.

4. The method of claim 3, wherein the CQI reports are received on a periodic basis according to a predefined pattern.

5. The method of claim 3, wherein the CQI reports are received on an on-demand basis.

6. The method of claim 3, wherein the CQI reports comprise filtered CQI measurements.

7. The method of claim 3, wherein each CQI report comprises a single codeword that represents the CQI reports for both the first wireless signal and the second wireless signal.

8. The method of claim 3, wherein receiving CQI reports comprises receiving a first CQI report for the first wireless signal in a first time slot and a second CQI report for the second wireless signal in a second time slot different than the first time slot.

9. The method of claim 3, wherein the wireless device is using a first number of carriers in the serving cell and wherein receiving CQI reports comprises receiving CQI reports prepared as though the wireless device was using a second number of carriers, the second number greater than the first number.

10. A network node for offloading a wireless device, the network node comprising:
 a processor configured to identify a second best cell, the second best cell providing to the wireless device a second wireless signal comprising a first signal characteristic less than a corresponding first signal characteristic of a first wireless signal provided by a serving cell;
 the processor further configured to obtain load information for the serving cell and the second best cell; and
 an interface coupled to the processor and configured to transmit a message to initiate offloading of the wireless device from the serving cell to the second best cell despite the first signal characteristic of the first wireless signal of the serving cell being better than the first signal characteristic of the second wireless signal of the second best cell.

11. The network node of claim 10, wherein the processor is further configured to, prior to offloading the wireless device, determine that a load of the serving cell exceeds a first threshold.

12. The network node of claim 10, wherein the interface is further configured to receive channel quality information (CQI) reports from the wireless device, the CQI reports comprising an indication of the first signal characteristic of the first wireless signal and the first signal characteristic of the second wireless signal.

13. The network node of claim 12, wherein the CQI reports are received on a periodic basis according to a predefined pattern.

14. The network node of claim 12, wherein the CQI reports are received on an on-demand basis.

15. The network node of claim 12, wherein the CQI reports comprise filtered CQI measurements.

16. The network node of claim 12, wherein each CQI report comprises a single codeword that represents the CQI reports for both the first wireless signal and the second wireless signal.

17. The network node of claim 12, wherein the interface configured to receive CQI reports is further configured to receive a first CQI report for the first wireless signal in a first time slot and a second CQI report for the second wireless signal in a second time slot different than the first time slot.

18. The network node of claim 12, wherein:

the wireless device is using a first number of carriers in the serving cell; and the interface configured to receive CQI reports is further configured to receive CQI reports prepared as though the wireless device was using a second number of carriers, the second number greater than the first number.

19. A network node for offloading a wireless device, the network node comprising a processor and computer readable storage media, the storage media containing instructions executable by the processor, whereby the network node is operative to:

identify a second best cell, the second best cell providing to the wireless device a second wireless signal comprising a first signal characteristic less than a corresponding first signal characteristic of a first wireless signal provided by a serving cell;

obtain load information for the serving cell and the second best cell; and offload the wireless device from the serving cell to the second best cell despite the first signal characteristic of the first wireless signal of the serving cell being better than the first signal characteristic of the second wireless signal of the second best cell.

20. The network node of claim 19, wherein the network node is further operative to, prior to offloading the wireless device, determine that a load of the serving cell exceeds a first threshold.

21. The network node of claim 19, wherein the network node is further operative to receive channel quality information (CQI) reports from the wireless device, the CQI reports comprising an indication of the first signal characteristic of the first wireless signal and the first signal characteristic of the second wireless signal.

22. The network node of claim 21, wherein the CQI reports are received on a periodic basis according to a predefined pattern.

23. The network node of claim 21, wherein the CQI reports are received on an on-demand basis.

24. The network node of claim 21, wherein the CQI reports comprise filtered CQI measurements.

25. The network node of claim 21, wherein each CQI report comprises a single codeword that represents the CQI reports for both the first wireless signal and the second wireless signal.

26. The network node of claim 21, wherein the network node operative to receive CQI reports is further operative to receive a first CQI report for the first wireless signal in a first time slot and a second CQI report for the second wireless signal in a second time slot different than the first time slot.

27. The network node of claim 21, wherein:

the wireless device is using a first number of carriers in the serving cell; and the network node operative to receive CQI reports is further operative to receive CQI reports prepared as though the wireless device was using a second number of carriers, the second number greater than the first number.

* * * * *